(12) United States Patent
Hensen et al.

(10) Patent No.: US 8,438,509 B2
(45) Date of Patent: May 7, 2013

(54) AUTOMATED GENERATION OF OXIDE PILLAR SLOT SHAPES IN SILICON-ON-INSULATOR FORMATION TECHNOLOGY

(75) Inventors: William K. Hensen, Beacon, NY (US); Michael D. Hulvey, Shelburne, VT (US); Amit Kumar, Williston, VT (US); Jeanne-Tania Sucharitaves, Bangkok (TH); Amanda L. Tessier, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 12/621,564

(22) Filed: Nov. 19, 2009

(65) Prior Publication Data

US 2010/0269085 A1    Oct. 21, 2010

Related U.S. Application Data

(60) Provisional application No. 61/169,482, filed on Apr. 15, 2009.

(51) Int. Cl.
*G06F 17/50*  (2006.01)
(52) U.S. Cl.
USPC .......................................................... 716/55
(58) Field of Classification Search ..................... 716/55
See application file for complete search history.

(56) References Cited

U.S. PATENT DOCUMENTS

| | | | |
|---|---|---|---|
| 6,437,405 B2 | 8/2002 | Kim | |
| 6,553,561 B2 | 4/2003 | Bard et al. | |
| 7,073,139 B2 | 7/2006 | Bard et al. | |
| 2003/0028855 A1* | 2/2003 | Bard et al. | 716/19 |
| 2003/0233628 A1 | 12/2003 | Rana et al. | |
| 2007/0097181 A1* | 5/2007 | Fujii et al. | 347/68 |
| 2010/0327339 A1* | 12/2010 | Tanaka et al. | 257/324 |

OTHER PUBLICATIONS

Mike C.W. Chow, et al., "An Improved Strategy with Transistor Re-sizing Capability for Converting Bulk CMOS Polygon Layout to SOI", IEEE, 1996, pp. 767-770.

* cited by examiner

*Primary Examiner* — Jack Chiang
*Assistant Examiner* — Brandon Bowers
(74) *Attorney, Agent, or Firm* — Cantor Colburn LLP; Richard Kotulak (57) ABSTRACT

A method of automated generation of oxide pillar (PX) slot shapes of a PX layer within silicon-on-insulator (SOI) structures that includes generating a placement grid on recess oxide (RX) shapes, creating PX placement markers on the placement grid along a perimeter of the RX shapes, filtering the PX placement markers, generating a PX slot shape corresponding to each filtered PX placement marker on the RX shapes, correcting location errors associated with the generated PX slot shapes, generating PX slot shapes on RX shapes of a predetermined size for which PX slot shapes were not generated, performing a verification operation of the PX slot shapes, and outputting the PX layer including the verified PX slot shapes.

22 Claims, 10 Drawing Sheets

AUTOMATED GENERATION OF OXIDE PILLAR SLOT SHAPES IN SILICON-ON-INSULATOR FORMATION TECHNOLOGY

BACKGROUND

The present invention relates to the generation of oxide pillar (PX) slot shapes in localized silicon-on-insulator (SOI) formation technology, and more specifically, to the automatic and orderly placement of rectangular PX slot shapes in complex sets of structures associated with localized SOI formation technology.

Figure 1:
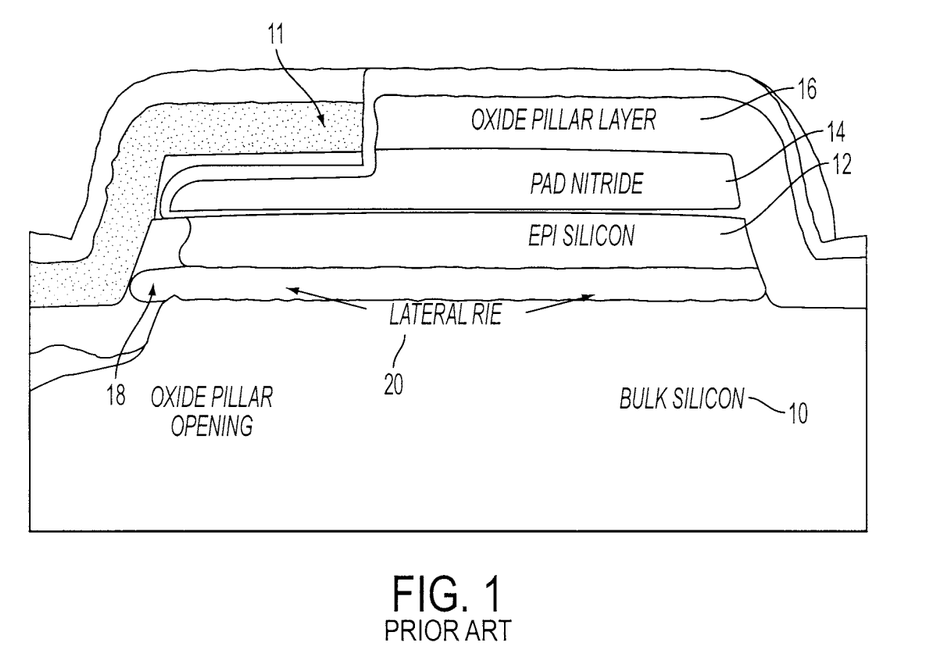
FIG. 1 illustrates an oxide pillar (PX) layer of an SOI structure according to the conventional art.

Today, in SOI formation technology, rectangular shapes (i.e., PX slot shapes) are placed on the edges of recess oxide (RX) shapes to allow for etching of slots and subsequent undercutting of epitaxial (epi) regions which form localized SOI regions. FIG. 1 illustrates a PX layer of an SOI structure according to the conventional art. As shown in FIG. 1, bulk silicon substrate 10 is provided where an epi region 12 is formed on top of the bulk silicon substrate 10 and a pad nitride film 14 is formed above the epi region 12. A PX layer 16 including a PX slot shape 11 is formed on top of a pad nitride film 14 and a PX opening 18 and a lateral trench 20 formed by reactive ion etching (RIE) is also provided.

Figure 2:
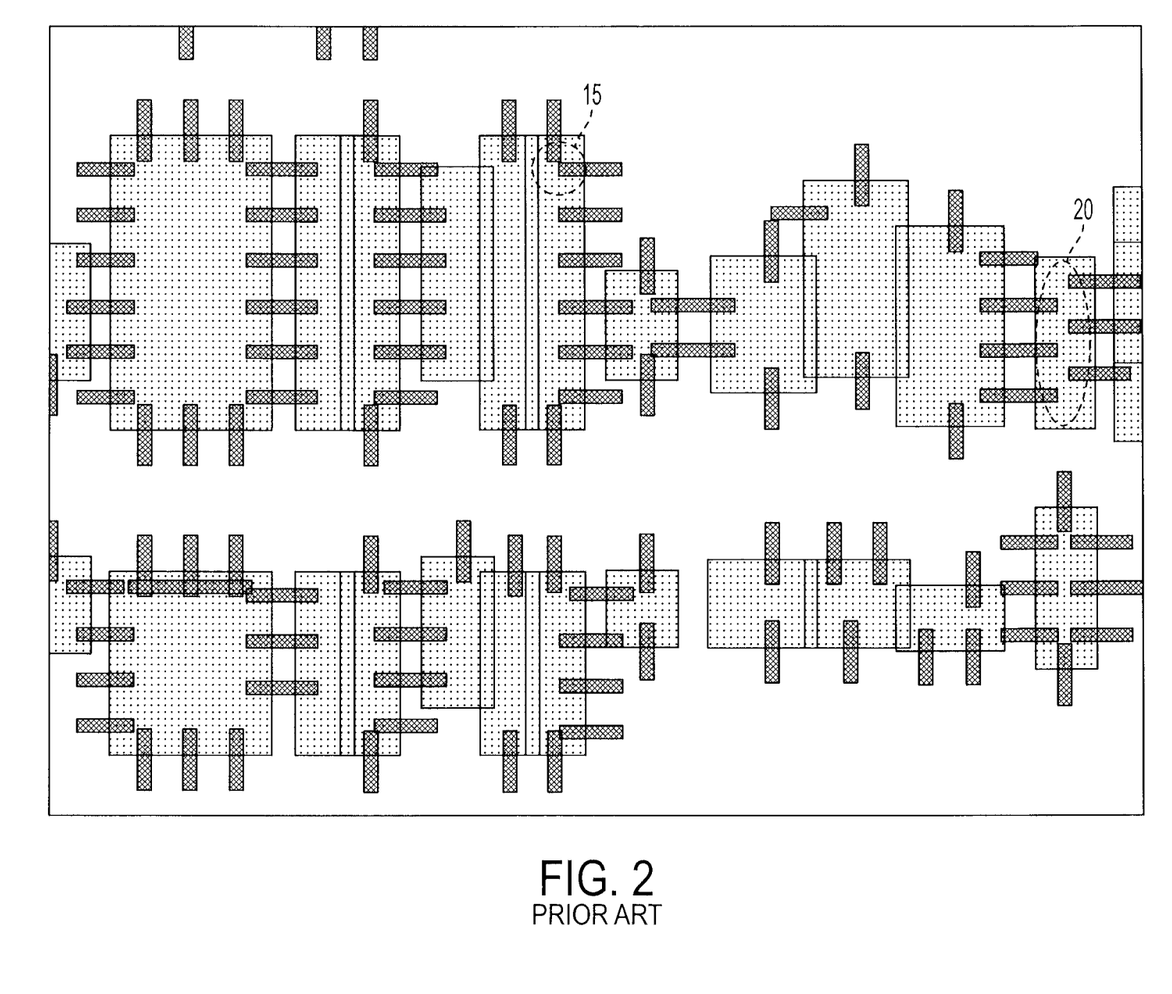
FIG. 2 illustrates an oxide pillar (PX) open level according to the conventional art.

In a conventional method of forming PX slot shapes, the placement of the shapes is performed manually during manufacturing. Typically, as shown in FIG. 2, the PX slot shapes formed in L-shapes, T-shapes, and vertical or horizontal shapes positioned in parallel. However, there are several problems associated with the conventional method. As shown in FIG. 2, since the PX slot shapes are manually placed on the RX shapes, some of the PX slot shapes may not be formed properly. For example, as shown in FIG. 2, the circled portion 15 indicates PX slot shapes positioned perpendicular to one another which are too close to one another and the circled portion 20 indicates PX slot shapes formed offset and in parallel, which are too close to one another.

SUMMARY OF THE INVENTION

The present invention provides an automated solution for placement of rectangular PX slot shapes in complex sets of structures associated with localized SOI formation technology during a manufacturing phase, to minimize manufacturability problems.

According to one embodiment of the present invention, a method of automated generation of oxide pillar (PX) slot shapes of a PX layer within silicon-on-insulator (SOI) structures is provided. The method includes generating a placement grid on recess oxide (RX) shapes, creating PX placement markers on the placement grid along a perimeter of the RX shapes, filtering the PX placement markers, generating a PX slot shape corresponding to each filtered PX placement marker on the RX shapes, correcting location errors associated with the generated PX slot shapes, generating PX slot shapes on RX shapes of a predetermined size for which PX slot shapes were not generated, performing a verification operation of the PX slot shapes, and outputting the PX layer including the verified PX slot shapes.

According to another embodiment of the present invention, a computer program product performing the above-mentioned method is also provided.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 3:
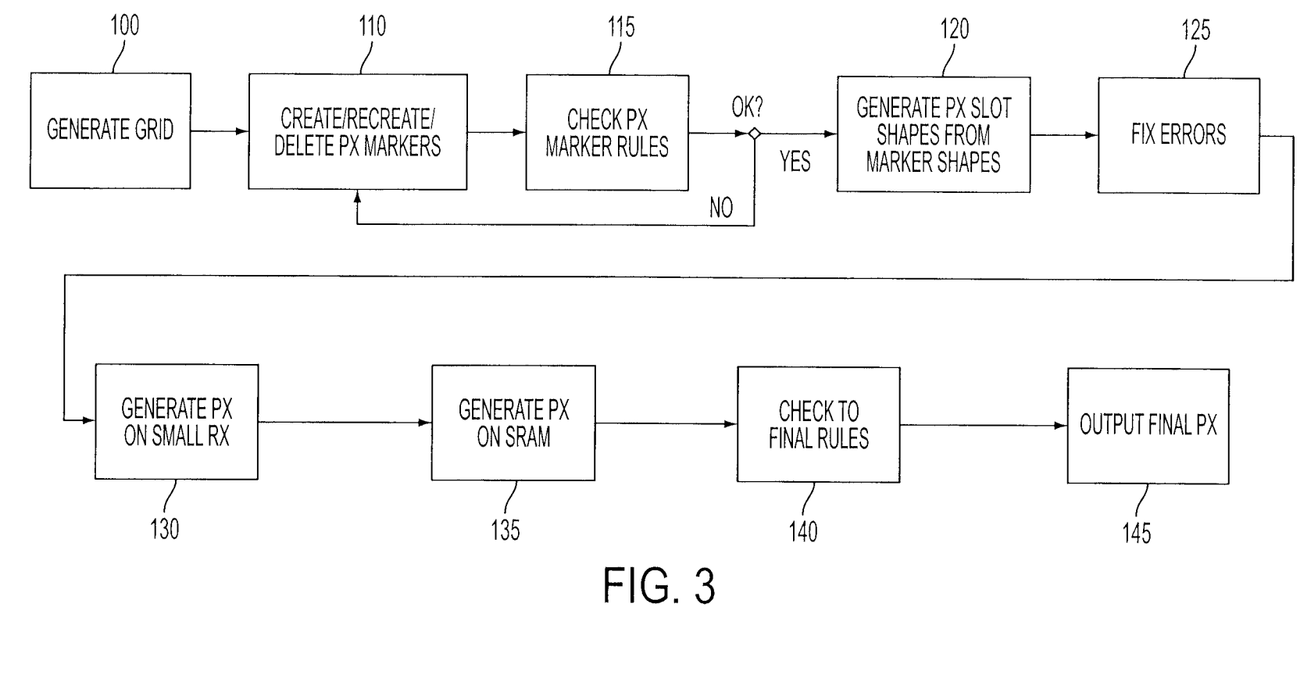
FIG. 3 is a flow chart illustrating a method for generating a PX layer that can be implemented within embodiments of the present invention.

With reference now to FIG. 3, there is a flow chart illustrating a method for generating a PX layer according to embodiments of the present invention. The operations shown in FIG. 3, for generating a PX layer will be discussed below with reference to FIGS. 4 through 10.

Figure 4:
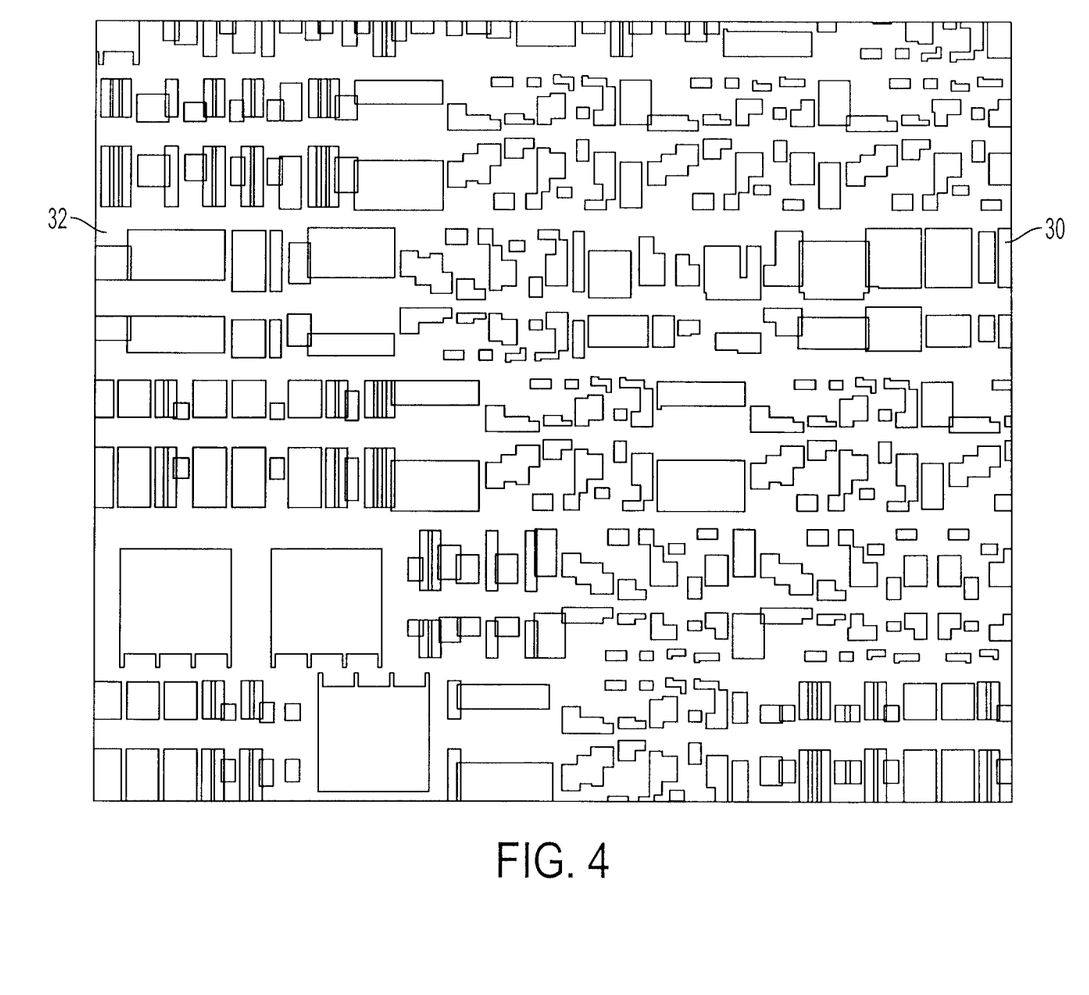
FIG. 4 is a diagram illustrating recess oxides (RX) shapes that can be implemented within embodiments of the present invention.
Figure 5:
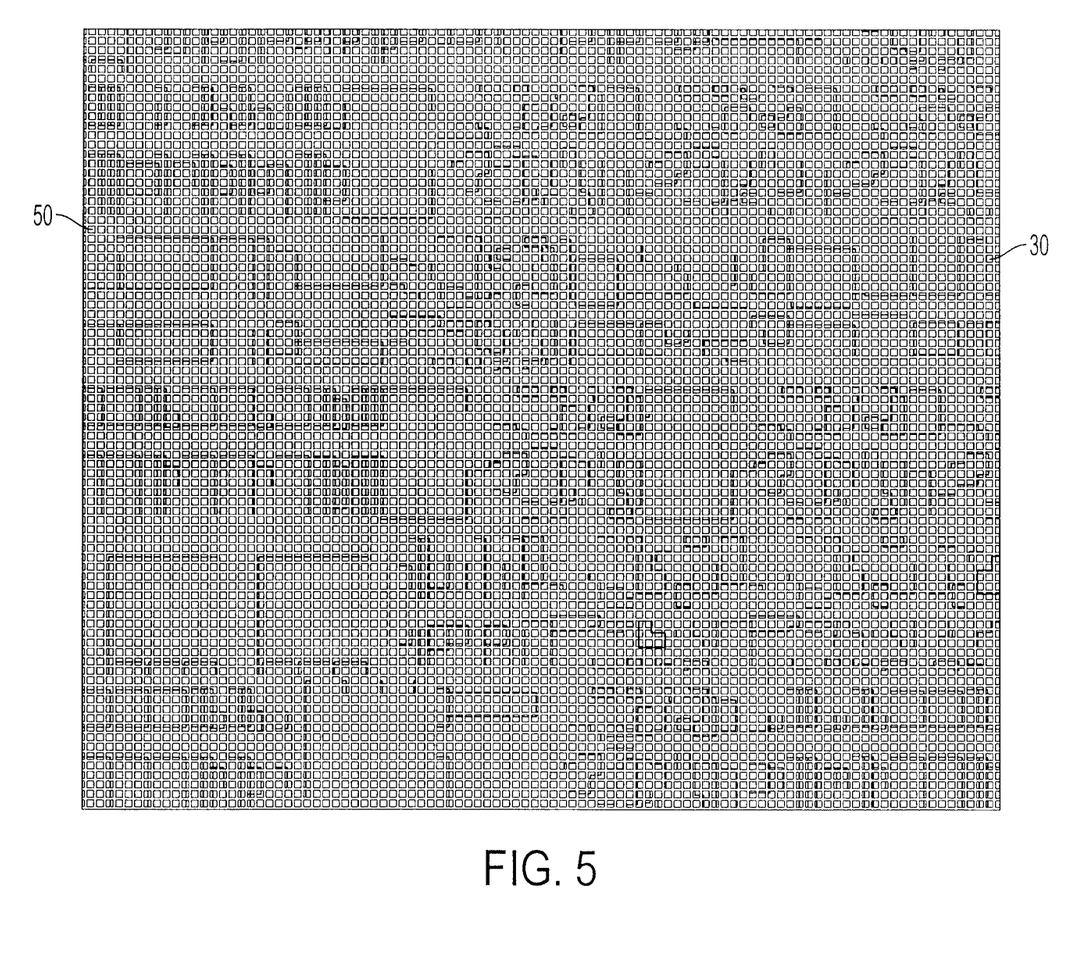
FIG. 5 is a diagram illustrating a placement grid generated according to embodiments of the present invention.

As shown in FIG. 4, according to an embodiment, RX shapes 30 are formed on a bulk silicon substrate 32. According to an embodiment of the present invention, a placement grid 50 (i.e., a marking grid) as depicted in FIG. 5 is generated on top of RX shapes 30 (operation 100 of FIG. 3). From operation 100, the process moves to operation 110, where PX placement markers 60a and 60b (depicted in FIG. 6) are created wherever the placement grid 50 intersects any of the RX shapes 30. That is, where the horizontal grid lines intersect the vertical edges (i.e., the left and right edges) of the RX shapes 30, and where the vertical grid lines intersect the horizontal edges (i.e., the top and bottom edges) of the RX shapes 30, PX placement markers 60a and 60b are created, respectively.

Figure 6:
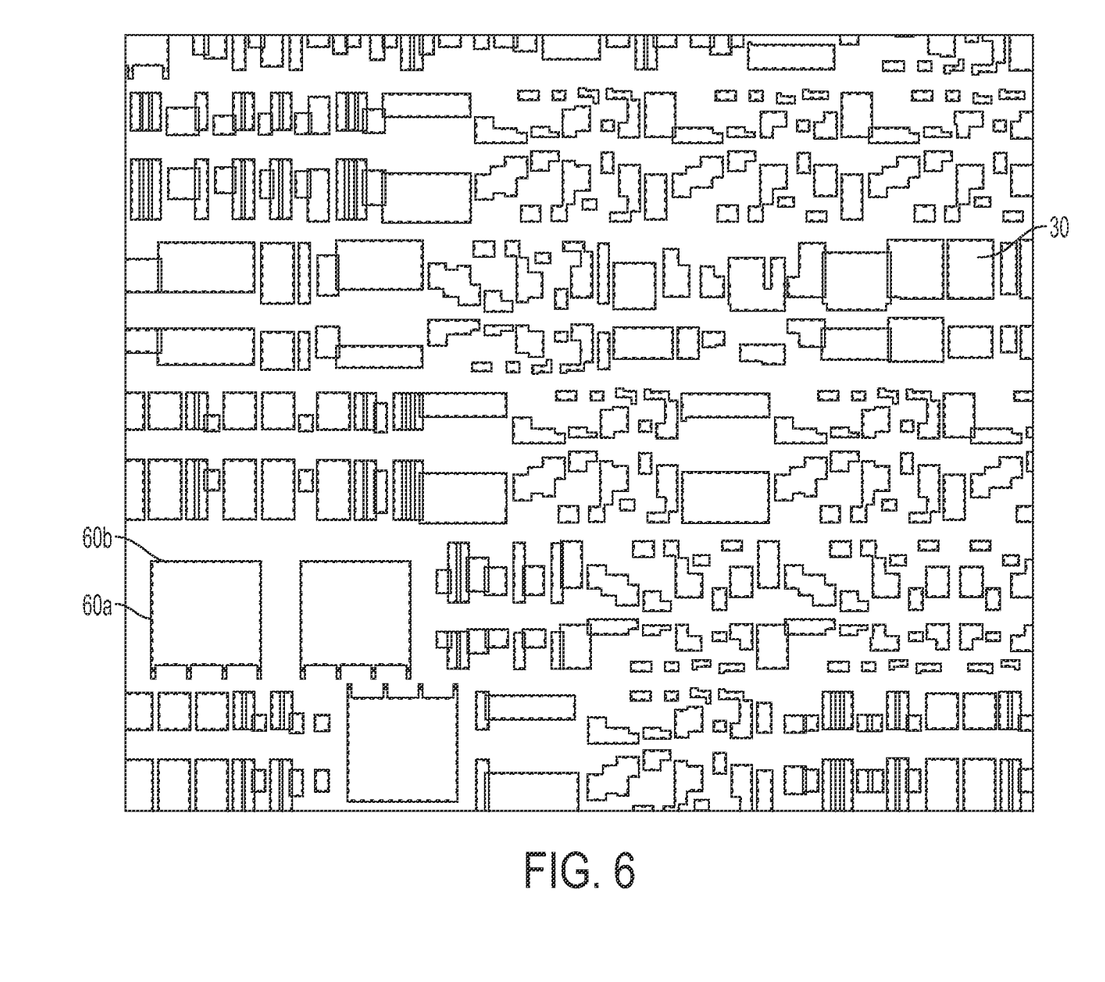
FIG. 6 is a diagram illustrating the generation of PX placement markers that can be implemented according to embodiments of the present invention.

Once the PX placement markers 60a and 60b are created in operation 110, the process moves operation 115, where invalid PX placement markers 60a and 60b are filtered out by performing a check of the PX placement markers 60a and 60b using a set of predetermined PX placement marker rules. According to an embodiment of the present invention, the set of PX placement marker rules may include, for example, determining whether the PX placement markers 60a and 60b do not land on the perimeter edges of an RX shape 30, determining whether a PX placement marker is too close to the corner of an RX shape 30, determining whether a PX placement marker 60a and 60b is too close to an adjacent RX shape 30, and determining whether a PX placement marker 60a and 60b is on an RX shape 30 which is less than a predetermined size, for example. As a result, all invalid PX placement markers 60a and 60b are deleted. According to one embodiment of the present invention, in some cases, the PX placement markers 60a and 60b may be recreated. For example, when a plurality of PX placement markers 60a and 60b are deleted from a respective RX shape 30, one of the PX placement markers 60a and 60b may be recreated now that the other PX placement markers 60a and 60b are deleted from the respective RX shape 30.

Figure 7:
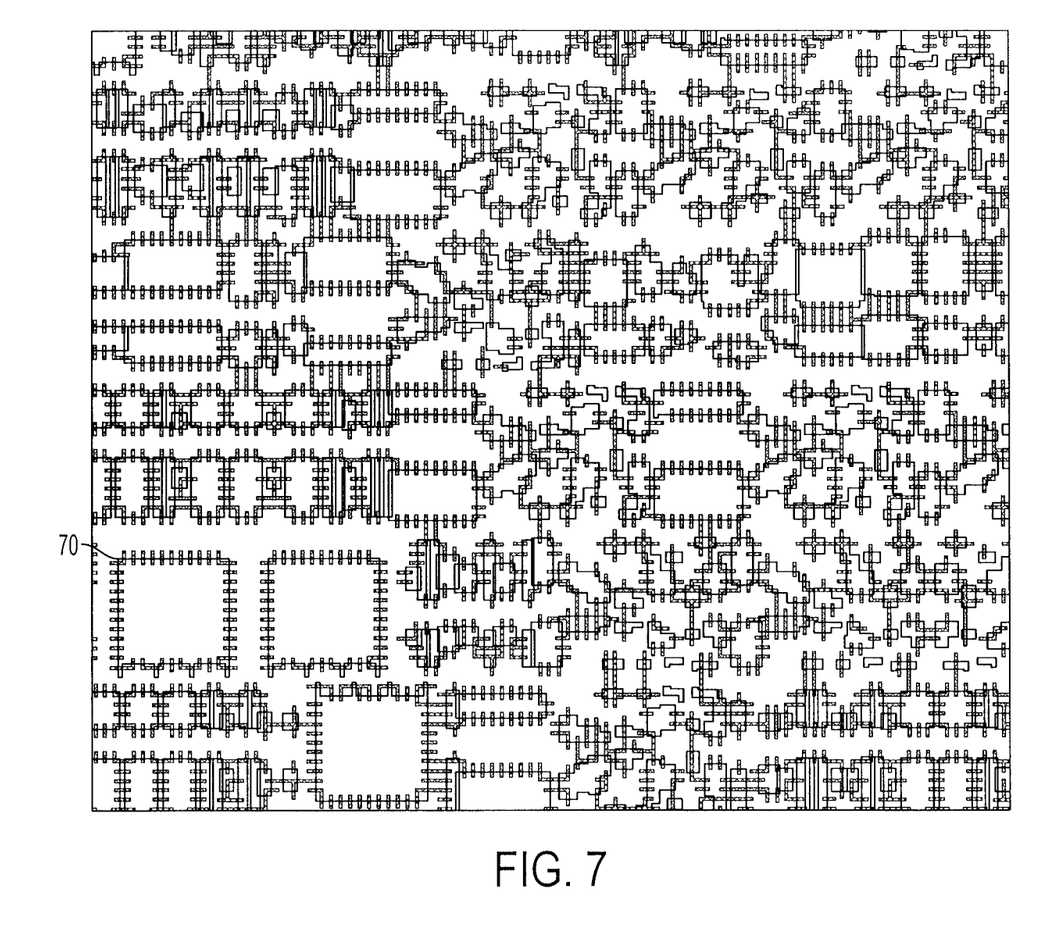
FIG. 7 is a diagram illustrating the formation of PX slot shapes that can be implemented within embodiments of the present invention.

Once it is determined that the PX placement markers 60a and 60b are all valid in operation 115, the process moves to operation 120, where PX slot shapes 70 (as depicted in FIG. 7) are generated corresponding to each PX placement marker 60a and 60b. According to an embodiment of the present invention, the PX slot shapes 70 are generated on the placement grid 50 (as depicted in FIG. 5). That is, according to an embodiment of the present invention, the PX slot shapes may only be placed on the vertical and horizontal lines of the grid 50. The PX slot shapes 70 are generating using shapes generation tools, such as caliber software tools, to grow the PX placement markers 60a and 60b in a direction inside and outside of the respective RX shape 30.

Figure 8:
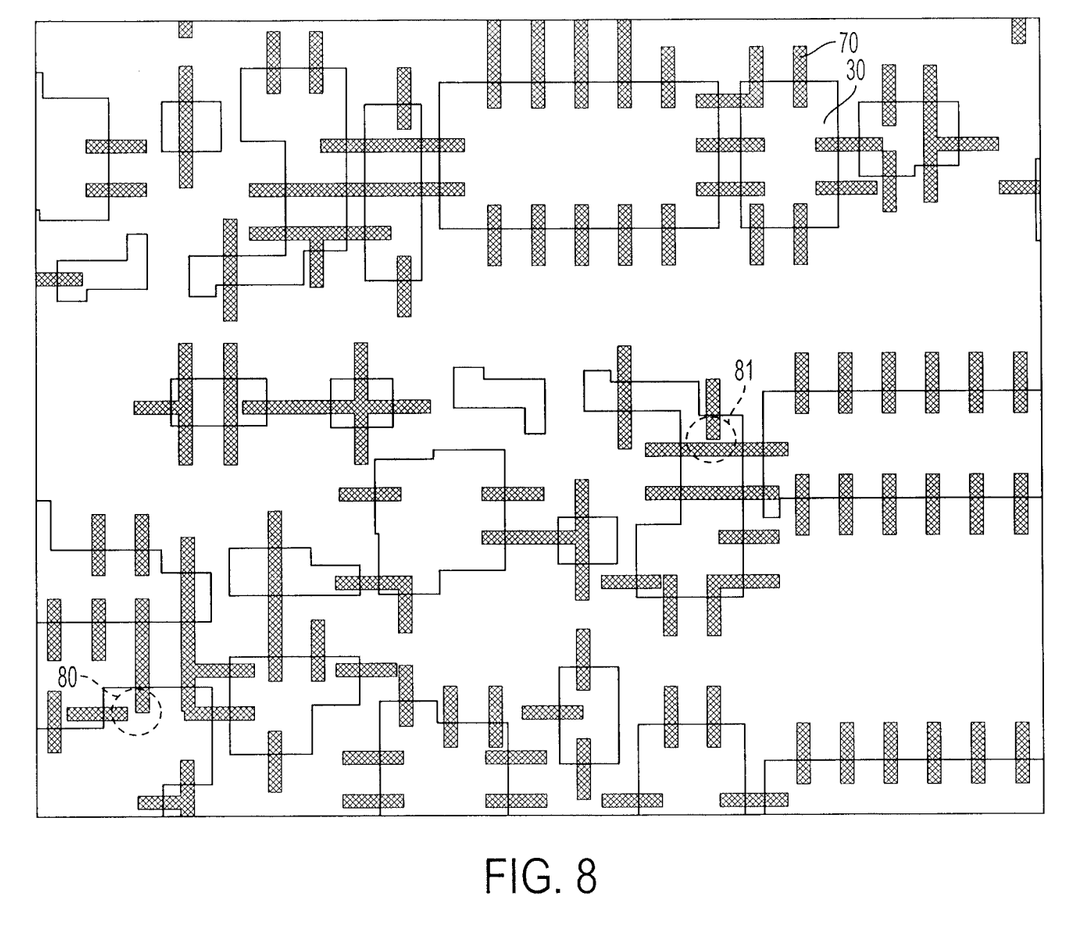
FIG. 8 is an exploded view of a portion of the diagram shown in FIG. 7.
Figure 9:
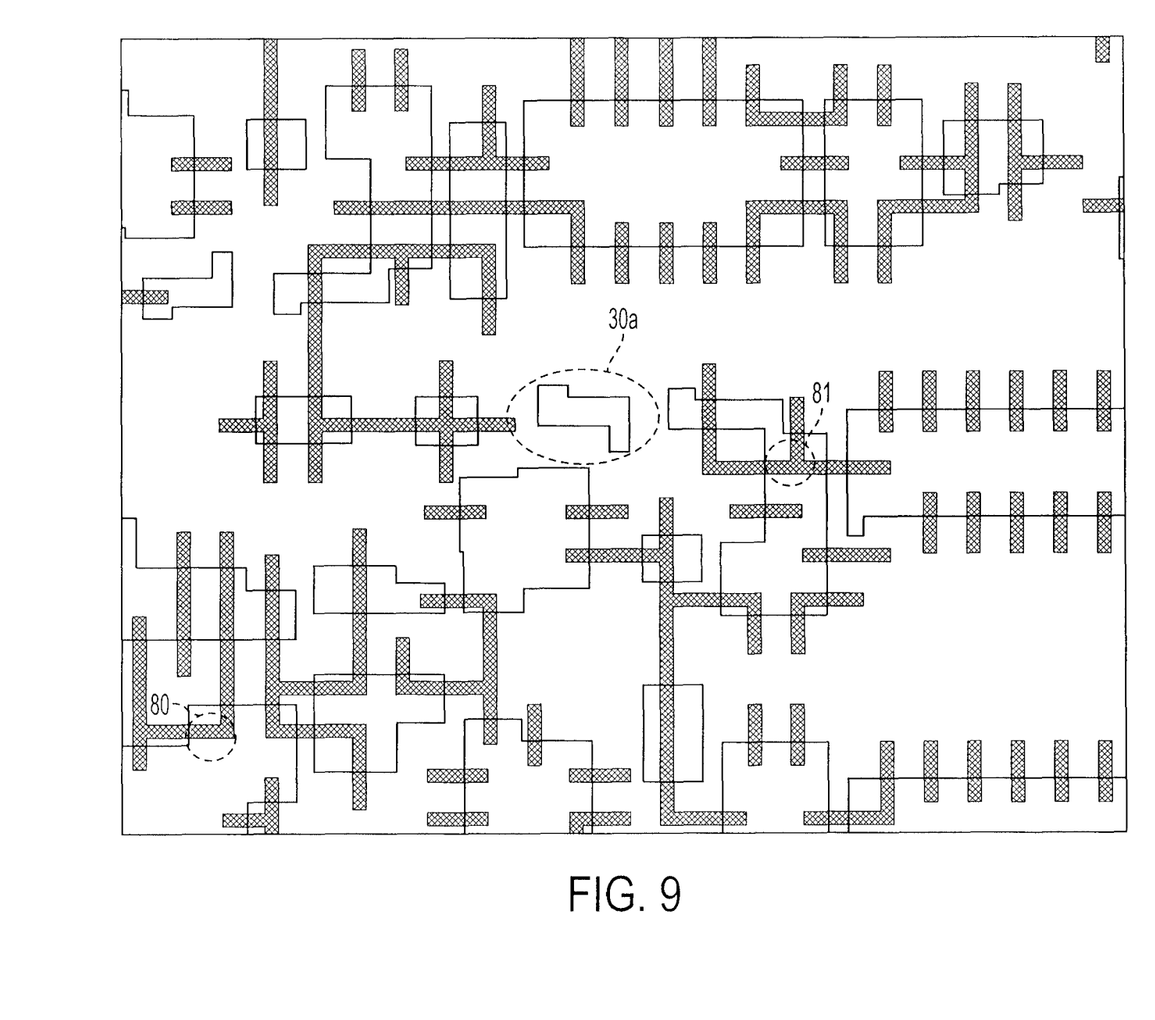
FIG. 9 is an exploded view illustrating location corrections made to PX slot shapes according to an embodiment of the present invention.

After the PX slot shapes 70 have been generated in operation 120, the process moves to operation 125 where location corrections are made to errors regarding the PX slot shapes 70 corresponding to each PX placement marker 60a and 60b. A set of predetermined ground rules are used to determine whether the PX slot shapes are satisfactory. The set of predetermined ground rules may include, for example, whether the PX slot shape 70 is of a minimum width or length, whether the PX slot shape 70 is of a predetermined area for a non-rectangular RX shape 30, whether the PX slot shape 70 overlaps the respective RX shape 30 and whether it extends outside of the RX shape 30. Examples of problems that may exist with PX slot shapes 70 can be seen in FIG. 8, for example. As shown in FIG. 8, there may be areas along the RX shape 30 where at least two PX slot shapes 70 are too close to each other as indicated by arrows 80 and 81, for example. If so, according to an embodiment of the present invention, the respective PX slot shapes 70 may be merged together using the shapes generation tools to shrink or grow the PX slot shapes 70 in order to fix errors, as shown in FIG. 9.

Figure 10:
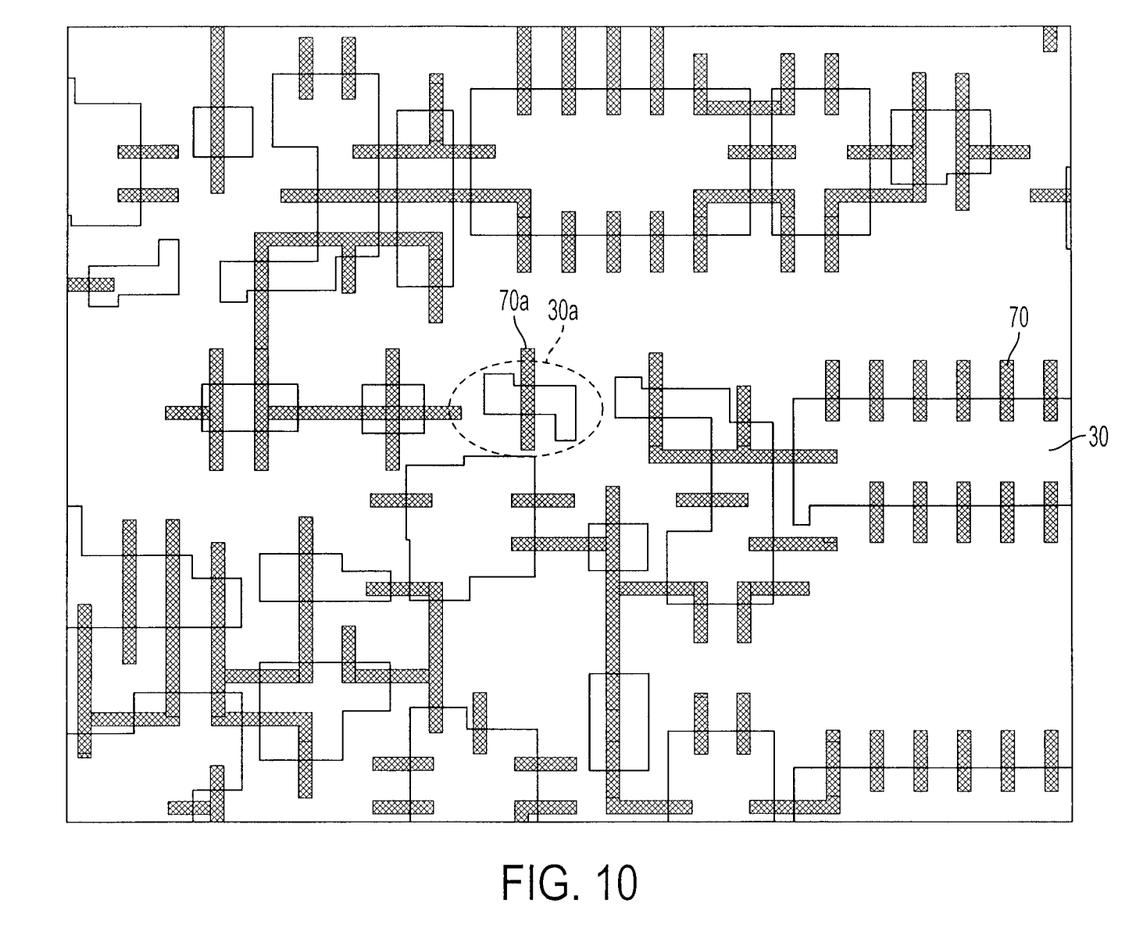
FIG. 10 is a diagram illustrating a placement of a custom PX slot shape on a small RX shape that can be implemented within embodiments of the present invention.

According to an embodiment of the present invention, each RX shape 30 is required to have a PX slot shape 70 generated thereon. Therefore, when PX slot shapes 70 are not formed on small RX shapes 30a which are less than a predetermined size (as depicted in FIG. 9), in operation 130 of FIG. 3, a custom PX slot shape 70a is generated on any small RX shapes 30a which did not have PX slot shapes 70 generated thereon, as shown in FIG. 10. According to an embodiment of the present invention, predetermined criteria may be used to generate custom PX slot shapes 70a on the small RX shapes 30a, for example, if the RX shape 30a is wider in the x-direction (i.e., the horizontal) than in the y-direction then a custom PX slot shape 70a is generated vertically. On the other hand, if the RX shape 30a is wider in the y-direction (i.e., the vertical direction) than in the x-direction, then the custom PX slot shape 70a is generated horizontally. Further, the custom PX slot shape 70a may be of a size corresponding to the size of the respective small RX shape 30a. The custom PX slot shape 70a is then checked using the predetermined ground rules to determine whether the custom PX slot shape 70a crosses the RX shape 30a and overlaps the RX shape 30a by a predetermined amount and to determine whether to custom PX slot shape 70a interferes with any of the existing PX slot shapes 70. According to an embodiment of the present invention, the custom PX slot shapes 70a may not be formed on along the grid 50 shown in FIG. 5.

From operation 130, the process moves to operation 135, where PX slot shapes are generated on memory arrays according to an embodiment of the present invention. In one embodiment, PX slot shapes are custom generated on the RX shapes of each SRAM From operation 135, the process moves to operation 140, where a final verification operation is performed. During the final verification operation, the PX slot shapes 70a, 70b are examined using the set of predetermined ground rules as used in operation 125 so that any errors found may be corrected. Once the final verification operation has been performed, the process moves to operation 145 where a final PX layer including the verified PX slot shapes is outputted.

The method for generating PX slot shapes according to embodiments of the present invention involves the use of a placement grid when generating PX slot shapes, and performing error check and correction operations, which provides the advantage of performing automatic and orderly placement of PX slot shapes in complex sets of structures associated with localized SOI formation technology during the manufacturing phase, to thereby improve manufacturability.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of generation of oxide pillar (PX) slot shapes of a PX layer within silicon-on-insulator (SOI) structures, the method comprising:
   generating, using a computer, a placement grid on recess oxide (RX) shapes;
   creating PX placement markers on the placement grid along a perimeter of the RX shapes;
   filtering the PX placement markers;
   generating a PX slot shape corresponding to each filtered PX placement marker on the RX shapes;
   correcting location errors associated with the generated PX slot shapes;
   generating PX slot shapes on RX shapes of a predetermined size for which PX slot shapes were not generated;
   performing a verification operation of the PX slot shapes; and
   outputting the PX layer including the verified PX slot shapes;
   wherein correcting location errors associated with the generated PX slot shapes comprises merging PX slot shapes that do not intersect or have a common border but which are perpendicular to each other and within a predetermined distance each other.

2. The method of claim 1, wherein creating the PX placement markers comprises:
   creating PX placement markers on the placement grid where horizontal lines of the placement grid intersect vertical perimeter edges of the RX shapes and where vertical lines of the placement grid intersect horizontal perimeter edges of the RX shapes.

3. The method of claim 2, wherein a plurality of PX placement markers are created to correspond to each RX shape.

4. The method of claim 3, wherein filtering the PX placement markers comprises performing a check of each PX placement marker using predetermined criteria and deleting invalid PX placement markers.

5. The method of claim 4, further comprising:
   recreating a PX placement marker of a plurality of invalid PX placement markers upon deleting remaining invalid PX placement markers from a respective RX shape.

6. The method of claim 5, wherein the predetermined criteria includes at least one of determining whether the PX placement markers are created on the vertical and horizontal perimeter edges of the RX shapes, determining whether the PX placement markers are within a predetermined distance of a corner portion of each RX shape, and determining whether the PX placement markers are on an RX shape which is less than a predetermined size.

7. The method of claim 6, wherein generating the PX slot shapes corresponding to each filtered PX placement marker on the RX shapes comprises:
   generating the PX slot shapes at the filtered PX placement markers corresponding to the placement grid such that the PX slot shapes are generated along the vertical and horizontal lines of the placement grid intersecting the RX shapes.

8. The method of claim 1, wherein generating PX slot shapes on RX shapes of a predetermined size for which PX slot shapes were not generated comprises:
   generating custom PX slot shapes on respective RX shapes that are less than a predetermined size based on predetermined criteria.

9. The method of claim 8, wherein a custom PX slot shape is generated vertically when the respective RX shape is wider in a horizontal direction, and horizontally when the respective RX shape is wider in a vertical direction.

10. The method of claim 9, wherein the custom PX slot shape crosses and overlaps the respective RX shape by a predetermined amount.

11. The method of claim 9, further comprising generating PX slot shapes on memory arrays.

12. A computer program product comprising a non-transitory computer useable medium including a computer readable program, wherein the computer readable program when executed on a computer causes the computer to implement a method of automated generation oxide pillar (PX) slot shapes of a PX layer within silicon-on-insulator (SOI) structures, the method comprising:
   generating a placement grid on recess oxide (RX) shapes;
   creating PX placement markers on the placement grid along a perimeter of the RX shapes;
   filtering the PX placement markers;
   generating a PX slot shape corresponding to each filtered PX placement marker on the RX shapes;
   correcting location errors associated with the generated PX slot shapes;
   generating PX slot shapes on RX shapes of a predetermined size for which PX slot shapes were not generated;
   performing a verification operation of the PX slot shapes; and
   outputting the PX layer including the verified PX slot shapes;
   wherein correcting location errors associated with the generated PX slot shapes comprises merging PX slot shapes that do not intersect or have a common border but which are perpendicular to each other and within a predetermined distance of each other.

13. The computer program product claim 12, wherein creating the PX placement markers comprises:
   creating PX placement markers on the placement grid where horizontal lines of the placement grid intersect vertical perimeter edges of the RX shapes and where vertical lines of the placement grid intersect horizontal perimeter edges of the RX shapes.

14. The computer program product of claim 13, wherein a plurality of PX placement markers are created to correspond to each RX shape.

15. The computer program product of claim 14, wherein filtering the PX placement markers comprises performing a check of each PX placement marker using predetermined criteria and deleting invalid PX placement markers.

16. The computer program product of claim 15, wherein the method further comprising:
   recreating a PX placement marker of a plurality of invalid PX placement markers upon deleting remaining invalid PX placement markers from a respective RX shape.

17. The computer program product of claim 16, wherein the predetermined criteria includes at least one of determining whether the PX placement markers are created on the vertical and horizontal perimeter edges of the RX shapes, determining whether the PX placement markers are within a predetermined distance of a corner portion of each RX shape, and determining whether the PX placement markers are on an RX shape which is less than a predetermined size.

18. The computer program product of claim 17, wherein generating the PX slot shapes corresponding to each filtered PX placement marker on the RX shapes comprises:
   generating the PX slot shapes at the filtered PX placement markers corresponding to the placement grid such that the PX slot shapes are generated along the vertical and horizontal lines of the placement grid intersecting the RX shapes.

19. The computer program product of claim 12, wherein generating PX slot shapes on RX shapes of a predetermined size for which PX slot shapes were not generated comprises:
   generating custom PX slot shapes on respective RX shapes that are less than a predetermined size based on predetermined criteria.

20. The computer program product of claim 19, wherein a custom PX slot shape is generated vertically when the respective RX shape is wider in a horizontal direction, and horizontally when the respective RX shape is wider in a vertical direction.

21. The computer program product of claim 20, wherein the custom PX slot shape crosses and overlaps the respective RX shape by a predetermined amount.

22. The computer program product of claim 12, wherein the method further comprising generating PX slot shapes on memory arrays.

* * * * *